US010375226B2

(12) United States Patent
Tanabe et al.

(10) Patent No.: US 10,375,226 B2
(45) Date of Patent: Aug. 6, 2019

(54) MOBILE ELECTRONIC DEVICE AND CONTROL METHOD

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP); Shinya Saito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/506,233

(22) PCT Filed: Aug. 27, 2015

(86) PCT No.: PCT/JP2015/074287
§ 371 (c)(1),
(2) Date: Feb. 23, 2017

(87) PCT Pub. No.: WO2016/031933
PCT Pub. Date: Mar. 3, 2016

(65) Prior Publication Data
US 2017/0257480 A1      Sep. 7, 2017

(30) Foreign Application Priority Data

Aug. 27, 2014  (JP) ................... 2014-172606
Dec. 24, 2014  (JP) ................... 2014-261198
Dec. 24, 2014  (JP) ................... 2014-261276

(51) Int. Cl.
*H04M 1/725*      (2006.01)
*G06F 1/16*       (2006.01)
(Continued)

(52) U.S. Cl.
CPC ...... *H04M 1/72569* (2013.01); *G06F 1/1626* (2013.01); *G06F 1/3231* (2013.01);
(Continued)

(58) Field of Classification Search
CPC ....................................................... H04W 8/245
See application file for complete search history.

(56) References Cited

U.S. PATENT DOCUMENTS 8,264,340 B2 *  9/2012  Mazzolini ............. G08B 13/14
                                                        340/521
8,862,427 B2    10/2014  Sakuraoka et al.
(Continued)

FOREIGN PATENT DOCUMENTS

JP    2003-37545 A     2/2003
JP    2003-345476 A    12/2003
(Continued)

OTHER PUBLICATIONS

International Search Report in PCT/JP2015/074287, dated Nov. 10, 2015.
(Continued)

*Primary Examiner* — Charles N Appiah
*Assistant Examiner* — Frank E Donado
(74) *Attorney, Agent, or Firm* — Hauptman Ham, LLP

(57) ABSTRACT

In one aspect, a mobile electronic device includes a first sensor configured to detect proximity to an own device, a second sensor configured to detect a biological response, and a controller configured to determine that the own device is present within a storing part provided on clothing when the biological response is detected by the second sensor in a case where proximity to the own device has been detected by the first sensor.

13 Claims, 13 Drawing Sheets

(51) Int. Cl.
  *G06F 1/32* (2006.01)
  *H04W 52/02* (2009.01)
  *G06F 3/0488* (2013.01)
  *G06F 1/3231* (2019.01)

(52) U.S. Cl.
  CPC ........ *G06F 3/0488* (2013.01); *H04W 52/028* (2013.01); *H04W 52/0254* (2013.01); *H04M 2250/12* (2013.01); *Y02D 70/00* (2018.01); *Y02D 70/10* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01)

(56) References Cited

U.S. PATENT DOCUMENTS

| | | | |
|---|---|---|---|
| 9,664,902 B1* | 5/2017 | Raffle | G02B 27/01 |
| 9,903,753 B2 | 2/2018 | Alameh et al. | |
| 2002/0142792 A1 | 10/2002 | Martinez | |
| 2003/0148760 A1 | 8/2003 | Takayanagi | |
| 2003/0197597 A1 | 10/2003 | Bahl et al. | |
| 2005/0136994 A1 | 6/2005 | Bahl et al. | |
| 2006/0019724 A1* | 1/2006 | Bahl | G06F 1/3203 |
| | | | 455/574 |
| 2008/0006762 A1 | 1/2008 | Fadell et al. | |
| 2010/0304757 A1 | 12/2010 | Yoshioka | |
| 2011/0151938 A1 | 6/2011 | Hashimoto et al. | |
| 2011/0282620 A1 | 11/2011 | Sakuraoka | |
| 2011/0319128 A1 | 12/2011 | Miwa | |
| 2013/0119255 A1* | 5/2013 | Dickinson | G04G 21/00 |
| | | | 250/340 |
| 2013/0130725 A1 | 5/2013 | Forutanpour et al. | |
| 2013/0150006 A1 | 6/2013 | Nunally et al. | |
| 2013/0194066 A1 | 8/2013 | Rahman et al. | |
| 2013/0222243 A1 | 8/2013 | Jung et al. | |
| 2014/0018097 A1 | 1/2014 | Goldstein | |
| 2014/0120990 A1 | 5/2014 | Parco et al. | |
| 2014/0289835 A1* | 9/2014 | Varshavsky | H04L 9/3231 |
| | | | 726/7 |

FOREIGN PATENT DOCUMENTS

| | | |
|---|---|---|
| JP | 2005-136845 A | 5/2005 |
| JP | 2009-296171 A | 12/2009 |
| JP | 2010-62849 A | 3/2010 |
| JP | 2010-207485 A | 9/2010 |
| JP | 2011-257374 A | 12/2011 |
| JP | 2013-175187 A | 9/2013 |
| JP | 2013-255192 A | 12/2013 |
| WO | 2009/147779 A1 | 12/2009 |
| WO | 2010/007765 A1 | 1/2010 |

OTHER PUBLICATIONS

Extended European Search Report in EP Application No. 15835525.5, dated Mar. 8, 2018, 8pp.

Shigenori Tanaka et al., Development of Health Management Application, Proceedings of the 76th (2014) Annual Conference of the Information Processing Society of Japan (4), IPSJ, Mar. 11, 2014, pp. 4-575 to 4-576, Japan, 8pp.

Extended European Search Report in EP Application No. 15836774.8, dated Mar. 8, 2018, 8pp.

Office Action in JP Application No. 2014-261277, dated Oct. 31, 2017, for which an explanation of relevance is attached, 3pp.

Hayashi Tomotaka, "Design and Implementation of a Context-Aware Content Delivery Service Using Tiny Mobile Sensors" Technical report of the Institute of Electronics, Information and Communication Engineers, Feb. 24, 2005, pp. 149-154, vol. 104, The Institute of Electronics, Information and Communication Engineers, Japan, with a partial English translation, 9pp.

Office Action in JP Application No. 2014-261277, dated May 16, 2017, for which an explanation of relevance is attached, 6pp.

International Search Report in PCT/JP2015/074288, dated Nov. 10, 2015, 6pp.

Kurasawa et al., "User Posture and Movement Estimation Based on 3-Axis Acceleration Sensor Position on the User's Body" IPSJ SIG Notes, May 23, 2006, pp. 15 to 22, vol. 2006, No. 54, ISSN 0919-6072, 8pp.

* cited by examiner

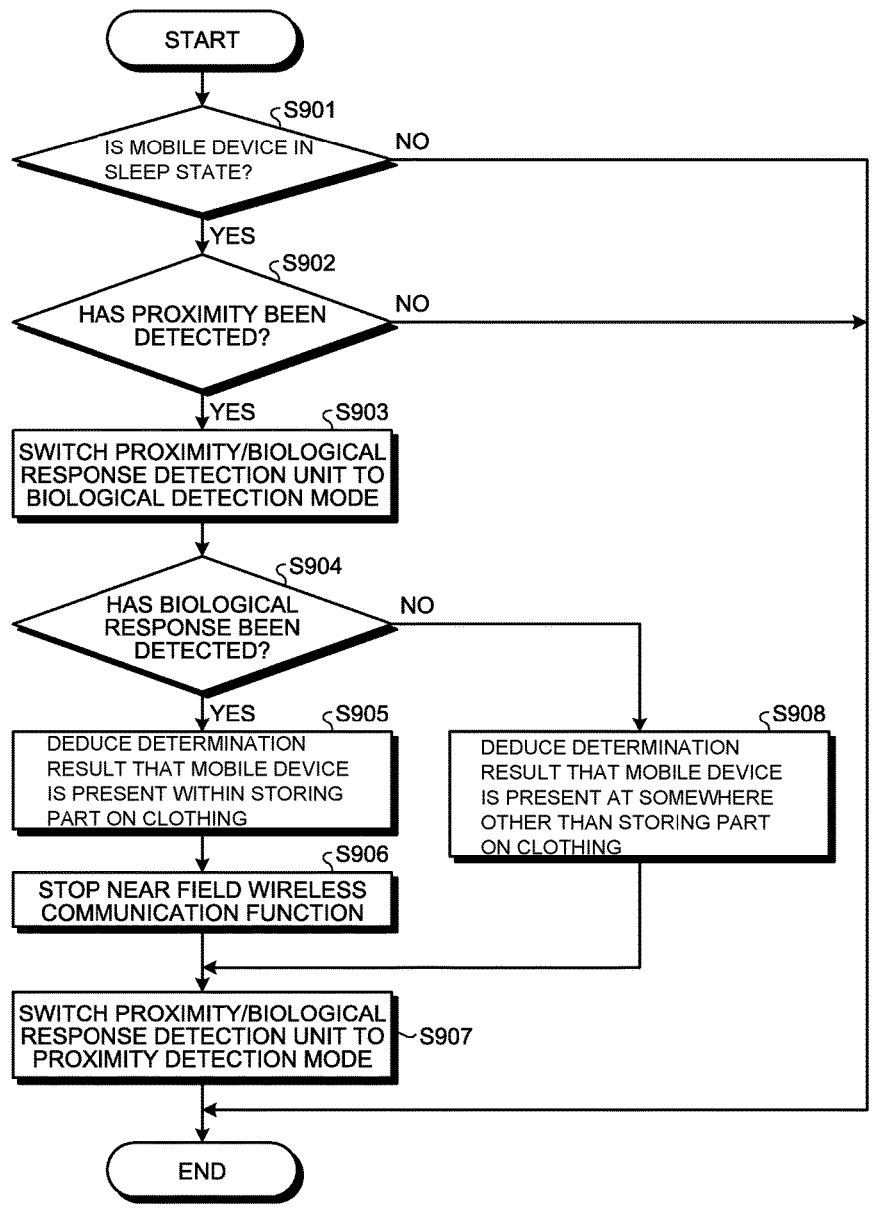

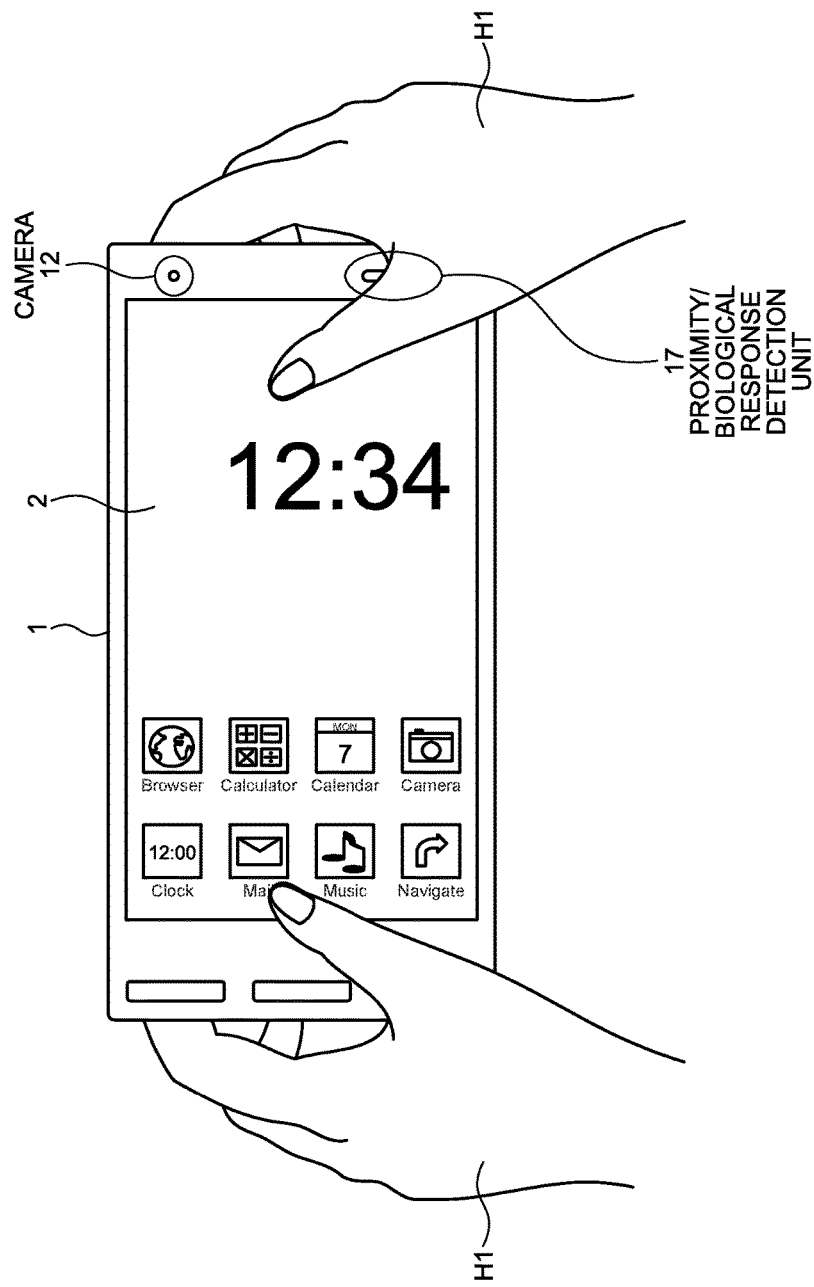

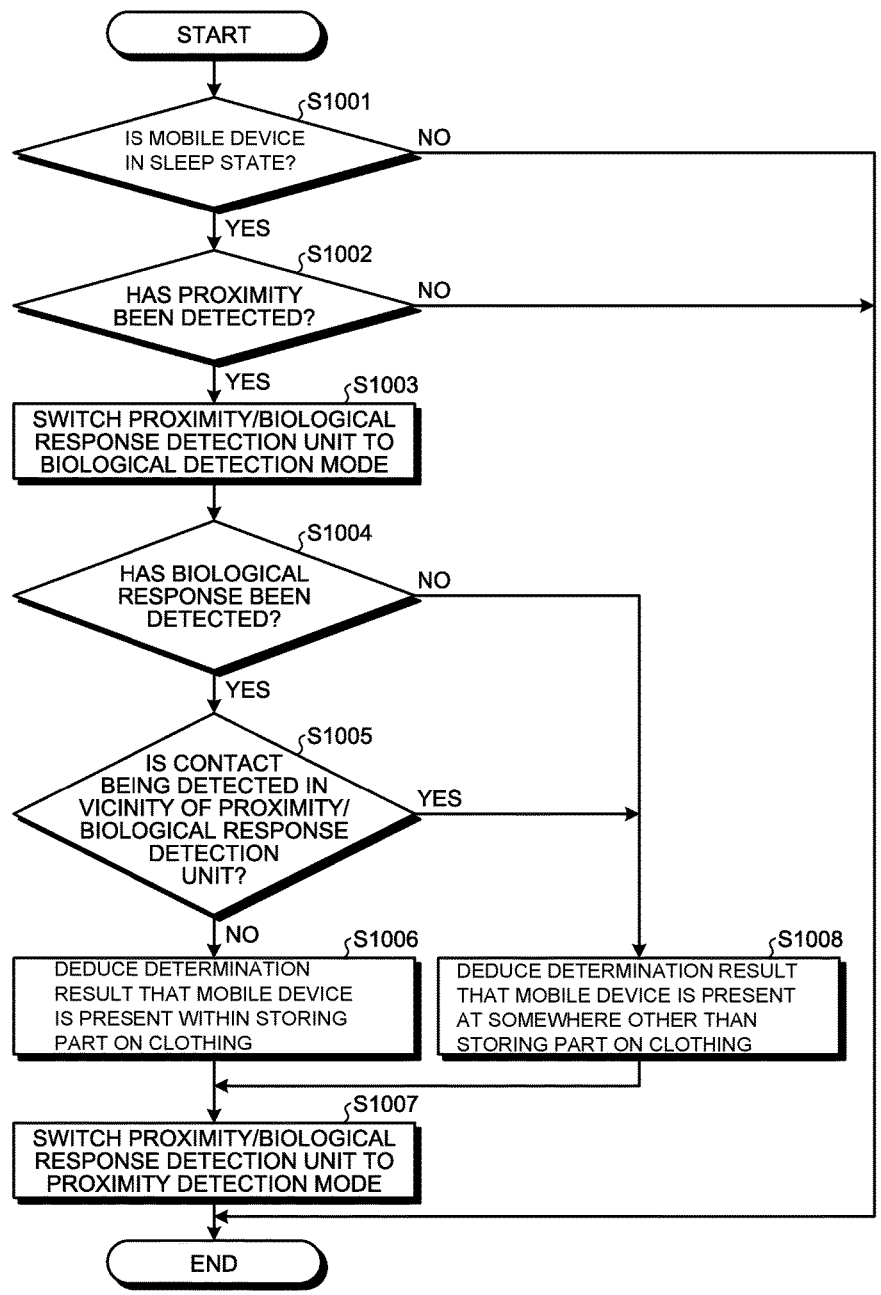

MOBILE ELECTRONIC DEVICE AND CONTROL METHOD

CROSS-REFERENCE TO RELATED APPLICATION

The present application is a National Phase entry of International Application No. PCT/JP2015/074287, filed Aug. 27, 2015, which claims priority of Japanese Application No. 2014-172606, filed Aug. 27, 2014 and Nos. 2014-261198 and 2014-261276 filed Dec. 24, 2014.

FIELD

The present application relates to a mobile electronic device and a control method.

BACKGROUND

Some mobile electronic devices such as a mobile phone and a smartphone have been equipped with various types of sensors in the past for the purpose of detecting a situation where the mobile electronic device is put.

SUMMARY

A mobile electronic device according to one embodiment includes a first sensor, a second sensor, and a controller. A first sensor is configured to detect proximity to a mobile device. A second sensor is configured to detect a biological response. A controller is configured to determine that the mobile device is present within a storing part provided on clothing when the biological response is detected by the second sensor in a case where proximity to the mobile device has been detected by the first sensor.

A mobile electronic device according to one embodiment includes a sensor and a controller. A sensor is configured to detect proximity to a mobile device and detect a biological response on an occasion when proximity to the mobile device is detected. A controller is configured to determine that the mobile device is present within a storing part provided on clothing when the biological response is detected by the sensor.

A control method according to one embodiment is that a mobile electronic device including a sensor is caused to carry out. The control method causes the mobile electronic device to carry out steps of detecting proximity to a mobile device, detecting a biological response when proximity to the mobile device is detected, and determining that the mobile device is present within a storing part provided on clothing when the biological response is detected.

BRIEF DESCRIPTION OF DRAWINGS

FIG. 11 is a flowchart illustrating flow of processing by a smartphone according to an example of the plurality of embodiments.

FIG. 12 is a view for explaining processing by a smartphone according to an example of the plurality of embodiments.

FIG. 13 is a flowchart illustrating flow of processing by a smartphone according to an example of the plurality of embodiments.

DETAILED DESCRIPTION

Figure 1:
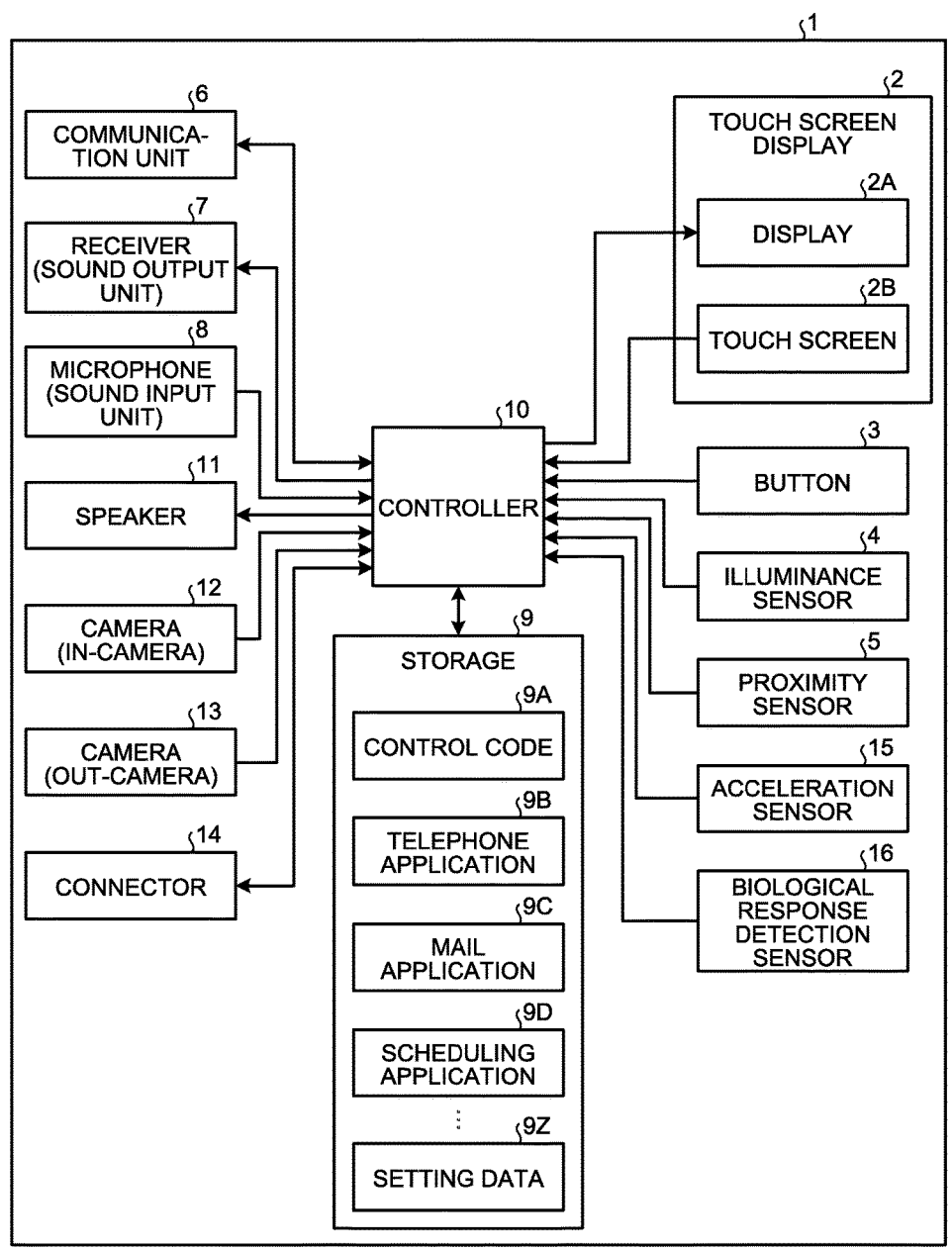
FIG. 1 is a block diagram illustrating a function configuration of a smartphone according to an example of a plurality of embodiments.

However, there still is room for improving a technique for detecting a situation where the mobile electronic device is put. For the reason described above, it is required to provide a mobile electronic device and a control method with an improved technique for detecting a situation where the mobile electronic device is put. A plurality of embodiments for carrying out a mobile electronic device and a control method according to the present application will be described in detail referring to the drawings. A smartphone will be described hereinafter as an example of the mobile electronic device.

A function configuration of a smartphone 1 according to an example of the plurality of embodiments will be described. FIG. 1 is a block diagram illustrating the function configuration of the smartphone 1. In the description below, similar constituent members are denoted by the same reference numeral in some cases. Furthermore, duplicated description is omitted in some cases.

As illustrated in FIG. 1, the smartphone 1 includes a touch screen display 2, a button 3, an illuminance sensor 4, a proximity sensor 5, a communication unit 6, a receiver 7, a microphone 8, a storage 9, a controller 10, a speaker 11, a camera 12, a camera 13, a connector 14, an acceleration sensor 15, and a biological response detection sensor 16.

The touch screen display 2 includes a display 2A and a touch screen 2B. For example, the display 2A and the touch screen 2B may be positioned so as to overlap, or alternatively, may be positioned side by side or away from each other. In a case where the display 2A and the touch screen 2B are positioned so as to overlap, for example, one side or a plurality of sides of the display 2A may not be along any side of the touch screen 2B.

The display 2A includes a display device such as a liquid crystal display (LCD), an organic electro-luminescence display (OELD), or an inorganic electro-luminescence display (IELD). The display 2A is capable of displaying a text, an image, a symbol, a figure, and other objects within a screen.

The screens displayed by the display 2A while containing these objects include a screen called a lock screen, a screen called a home screen, and an application screen displayed during the execution of an application. The home screen is also called a desktop, an idle screen, a standby screen, a standard screen, an application list screen, or a launcher screen in some cases.

The touch screen 2B is capable of detecting contact made on the touch screen 2B with one or a plurality of fingers, one or a plurality of pens, one or a plurality of stylus pens, or the like. The touch screen 2B is capable of detecting positions on the touch screen 2B with which one or a plurality of fingers, one or a plurality of pens, one or a plurality of stylus pens, or the like makes contact. A finger, a pen, a stylus pen, or the like detected by the touch screen 2B are noted as "finger" in some cases. A position contacted or approached by the finger detected by the touch screen 2B is noted as "detection position" in some cases. The touch screen 2B is capable of notifying the controller 10 of contact made on the touch screen 2B with the finger along with a position of a contacted place on the touch screen display 2. The action that the touch screen 2B is capable of carrying out can be carried out by the touch screen display 2 including the touch screen 2B. In other words, the action carried out by the touch screen 2B may be carried out by the touch screen display 2. Operation made on the touch screen 2B can be expressed as operation made on the touch screen display 2 including the touch screen 2B in different words. Operation made on the touch screen 2B can be expressed as operation made on the smartphone 1 including the touch screen 2B in different words.

A detection method of the touch screen 2B may be any method such as an electrostatic capacitance method, a resistive film method, a surface acoustic wave method, an ultrasonic method, an infrared method, an electromagnetic induction method, and a load detection method. For a simple description, the following description assumes that a user makes contact with the touch screen 2B with his/her finger to operate the smartphone 1.

The controller 10 is capable of distinguishing the classifications of gestures on the basis of at least one of the number of points of contact detected by the touch screen 2B, a position at which contact is detected, a change in a position at which contact is detected, a time length during which contact is being detected, a time interval at which contact is detected, and the number of times contact is detected. The action that the controller 10 is capable of carrying out can be carried out by the smartphone 1 including the controller 10. In other words, the action carried out by the controller 10 may be carried out by the smartphone 1. A gesture is operation carried out on the touch screen 2B by using a finger. Examples of the gestures distinguished by the controller 10 through the touch screen 2B include, but are not limited to, a touch, a long touch, a release, a swipe, a tap, a double tap, a long tap, a drag, a flick, a pinch in, a pinch out, etc.

The button 3 accepts operation input from the user. Upon accepting the operation input from the user, the button 3 notifies the controller 10 of having accepted the operation input. A single button 3 or a plurality of buttons 3 may be employed regarding the number thereof.

The illuminance sensor 4 is capable of detecting illuminance of surrounding light of the smartphone 1. The illuminance represents intensity of light or brightness. The illuminance sensor 4 may be used to, for example, adjust the luminance of the display 2A.

The proximity sensor 5 is capable of detecting a presence of an object in the neighborhood thereof without contact. For example, the proximity sensor 5 is capable of detecting a presence of an object and a distance to the object on the basis of an infrared ray reflected from the object. The proximity sensor 5 may be used to, for example, detect a face of the user having been moved closer to the display 2A. The illuminance sensor 4 and the proximity sensor 5 may be configured as a single sensor. The proximity sensor 5 may be a sensor that detects a presence of an object and a distance to the object on the basis of, for example, a change in a magnetic field or a change in a return time of a reflected wave of an ultrasonic wave instead of the infrared ray. The proximity sensor 5 may be a unit integrated with any one of or a plurality of the illuminance sensor 4, the cameras 12 and 13, the touch screen 2B, a touch switch, and the like. The proximity sensor 5 serves as an example of a first sensor.

The communication unit 6 is capable of communicating wirelessly. The communication unit 6 supports a wireless communication standard. The wireless communication standards supported by the communication unit 6 include communication standards for cellular phones such as 2G, 3G, and 4G and communication standards for near field wireless communication. Examples of the communication standards for cellular phones include the long term evolution (LTE), the wideband code division multiple access (W-CDMA), the Worldwide Interoperability for Microwave Access (Wi-MAX) (registered trademark), CDMA2000, the personal digital cellular (PDC), the Global System for Mobile Communications (GSM) (registered trademark), and the personal handy-phone system (PHS). Examples of the communication standards for near field wireless communication include IEEE802.11 (where IEEE is an abbreviation of The Institute of Electrical and Electronics Engineers, Inc.), Bluetooth (registered trademark), ZigBee (registered trademark), the digital enhanced cordless telecommunications (DECT), Z-Wave, the wireless smart utility network (WiSun), the infrared data association (IrDA), the near field communication (NFC), and the wireless personal area network (WPAN). Examples of a communication standard for WPAN include ZigBee (registered trademark). The communication unit 6 may support one or a plurality of the aforementioned communication standards.

The receiver 7 is included in a sound output unit. The receiver 7 is capable of outputting tone signals transmitted from the controller 10 as sounds. The receiver 7 may be used to, for example, output a voice from a person the user is talking with during the telephone conversation. The microphone 8 is included in a sound input unit. The microphone 8 may be used to convert a voice of the user or the like to a tone signal to transmit to the controller 10.

The storage 9 is capable of storing a code and data. The storage 9 can be used as a working area temporarily storing a processing result of the controller 10. The storage 9 may include any non-transitory storage medium such as a semiconductor storage medium or a magnetic storage medium. The storage 9 may include a plurality of types of storage media. The storage 9 may include a combination of a transportable storage medium such as a memory card, an optical disc, or a magneto-optical disk and a reading apparatus for the storage medium. The storage 9 may include a storage device used as a temporary storage area such as a random access memory (RAM).

Codes stored in the storage 9 include an application executed in foreground or background and a control code that assists the action of the application. According to an application executed in foreground, for example, a screen thereof is displayed on the display 2A. Examples of the control code include an OS. The application and the control code may be installed in the storage 9 through the wireless communication via the communication unit 6 or a non-transitory storage medium.

The storage 9 is capable of storing a control code 9A, a telephone application 9B, a mail application 9C, a scheduling application 9D, setting data 9Z, and the like.

The control code 9A provides functions relating to various types of control of the smartphone 1. For example, the control code 9A can provide a function for determining that a mobile device is present within a storing part provided on clothing when a biological response is detected by a second sensor in a case where the proximity to the mobile device has been detected by the first sensor. For example, the control code 9A can provide a function for determining that the mobile device is present at somewhere other than the aforementioned storing part when the biological response is not detected by the aforementioned second sensor in a case where the proximity to the mobile device has been detected by the aforementioned first sensor. For example, the control code 9A can provide a function for determining that the mobile device is present within the aforementioned storing part by virtue of a condition that the proximity to the mobile device is continuously detected by the aforementioned first sensor after determining that the mobile device is present within the aforementioned storing part. For example, the control code 9A can provide a function for determining that the mobile device is present within the aforementioned storing part by virtue of a condition that the biological response is continuously detected by the aforementioned second sensor after determining that the mobile device is present within the aforementioned storing part. For example, the control code 9A can provide a function for carrying out the determination on whether the mobile device is present within the aforementioned storing part in a case where the smartphone 1 is in a sleep state. For example, the control code 9A can provide a function for carrying out the determination on whether the mobile device is present within the aforementioned storing part by virtue of a condition that the smartphone 1 has shifted to the sleep state from an active state. For example, the control code 9A can provide a function for carrying out the determination on whether the mobile device is present within the aforementioned storing part by virtue of a condition that the smartphone 1 has shifted to the active state from the sleep state. For example, the control code 9A can provide a function for carrying out the determination on whether the mobile device is present within the aforementioned storing part by virtue of a condition that a change in a movement state of the mobile device is detected by a third sensor. For example, the control code 9A can provide a function for carrying out the determination on whether the mobile device is present within the aforementioned storing part by virtue of a condition that an event has occurred.

The telephone application 9B is capable of providing a telephone conversation function for the telephone conversation by way of the wireless communication. The mail application 9C is capable of providing an e-mail function for, for example, composing, transmitting, receiving, and displaying an e-mail. The scheduling application 9D is capable of providing a function for managing a schedule.

The setting data 9Z includes various types of data used in processing by the control code 9A. For example, the setting data 9Z includes a trigger condition for determining that the mobile device is present within the aforementioned storing part. The setting data 9Z includes a time condition used by the control code 9A to determine that the proximity to the mobile device is continuously detected by the first sensor. The setting data 9Z includes a time condition used by the control code 9A to determine that the biological response is continuously detected by the second sensor.

The controller 10 includes a computational processing unit. Examples of the computational processing units include, but are not limited to, a central processing unit (CPU), a system-on-a-chip (SoC), a micro control unit (MCU), a field-programmable gate array (FPGA), a coprocessor, etc. Another constituent member such as the communication unit 6 can be integrated with the SoC. The controller 10 integrally controls the action of the smartphone 1, thereby being able to realize various types of functions. The controller 10 serves as an example of a controller.

Specifically, the controller 10 can execute an instruction included in a code stored in the storage 9 while referring to data stored in the storage 9 as necessary. The controller 10 controls a function unit in accordance with the data and the instruction, thereby being able to realize various types of functions. Examples of the function unit include, but are not limited to, the display 2A, the communication unit 6, the microphone 8, the speaker 11, etc. The controller 10 changes the control in some cases depending on a detection result of a detector. Examples of the detectors include, but are not limited to, the touch screen 2B, the button 3, the illuminance sensor 4, the proximity sensor 5, the microphone 8, the camera 12, the camera 13, the acceleration sensor 15, the biological response detection sensor 16, etc.

For example, by executing the control code 9A, the controller 10 can realize processing of determining that the mobile device is present within a storing part provided on clothing when the biological response is detected by the second sensor in a case where the proximity to the mobile device has been detected by the first sensor. For example, by executing the control code 9A, the controller 10 can realize processing of determining that the mobile device is present at somewhere other than the aforementioned storing part when the biological response is not detected by the aforementioned second sensor in a case where the proximity to the mobile device has been detected by the aforementioned first sensor. For example, by executing the control code 9A, the controller 10 can realize processing of determining that the mobile device is present within the aforementioned storing part by virtue of a condition that the proximity to the mobile device is continuously detected by the aforementioned first sensor after determining that the mobile device is present within the aforementioned storing part. For example, by executing the control code 9A, the controller 10 can realize processing of determining that the mobile device is present within the aforementioned storing part by virtue of a condition that the biological response is continuously detected by the aforementioned second sensor after determining that the mobile device is present within the aforementioned storing part. For example, by executing the control code 9A, the controller 10 can carry out the determination on whether the mobile device is present within the aforementioned storing part in a case where the smartphone 1 is in the sleep state. For example, by executing the control code 9A, the controller 10 can carry out the determination on whether the mobile device is present within the aforementioned storing part by virtue of a condition that the smartphone 1 has shifted to the sleep state from the active state. For example, by executing the control code 9A, the controller 10 can carry out the determination on whether the mobile device is present within the aforementioned storing part by virtue of a condition that the smartphone 1 has shifted to the active state from the sleep state. For example, by executing the control code 9A, the controller 10 can carry out the determination on whether the mobile device is present within the aforementioned storing part by virtue of a condition that a change in a movement state of the mobile device is detected by the third sensor. For example, by executing the control code 9A, the controller 10 can carry out the determination on whether the mobile device is present within the aforementioned storing part by virtue of a condition that an event has occurred.

The speaker 11 is included in the sound output unit. The speaker 11 is capable of outputting tone signals transmitted from the controller 10 as sounds. The speaker 11 can be used to, for example, output a ringtone and music. One of the receiver 7 and the speaker 11 can have a function of the other.

The camera 12 and the camera 13 are capable of converting a captured image to an electrical signal. The camera 12 is an in-camera that images an object facing the display 2A. The camera 13 is an out-camera that images an object facing a surface on an opposite side of the display 2A. The camera 12 and the camera 13 may be implemented in the smartphone 1 in a functionally and physically integrated state as a camera unit that can be switched between the in-camera and the out-camera when used.

The connector 14 includes a terminal to which another apparatus is connected. The connector 14 may be a general-purpose terminal such as the universal serial bus (USB), the High-Definition Multimedia Interface (HDMI) (registered trademark), Light Peak (Thunderbolt (registered trademark)), and an earphone microphone connector. The connector 14 may be a dedicated terminal such as a Dock connector. Examples of the apparatuses connected to the connector 14 include, but are not limited to, an external storage, a speaker, a communication apparatus, etc.

The acceleration sensor 15 is capable of detecting a direction and the degree of acceleration acting on the smartphone 1. The controller 10 is capable of detecting a change in the movement state of the smartphone 1 on the basis of the direction and the degree of the acceleration detected by the acceleration sensor 15 or an acceleration pattern constituted by a time-series change in the direction and the degree of the acceleration. The acceleration sensor 15 serves as an example of the third sensor.

The biological response detection sensor 16 is capable of detecting the biological response. The biological response detection sensor 16 can detect a heartbeat as the biological response, can detect a pulse of the heart as the biological response, can detect an electrical signal emitted from the heart as the biological response, and can detect a gas discharged to the outside of the body as the biological response. In a case where the heartbeat is detected as the biological response, the biological response detection sensor 16 can use an infrared sensor or the like. In a case where the pulse of the heart is detected as the biological response, the biological response detection sensor 16 can use the acceleration sensor or the like. In a case where the electrical signal emitted from the heart is detected as the biological response, the biological response detection sensor 16 can use an electric potential sensor or the like. In a case where the gas discharged to the outside of the body is detected as the biological response, the biological response detection sensor 16 can use a gas sensor or the like. The gas sensor is only required to detect at least one of acetone, carbon dioxide, nonenal, ammonia, methane, and so on. The biological response detection sensor 16 serves as an example of the second sensor.

The smartphone 1 may be provided with a GPS receiving unit and a vibrator in addition to the aforementioned respective function modules. The GPS receiving unit receives a radio signal from a GPS satellite in a predetermined frequency band and then carries out demodulation processing on the received radio signal to send the processed signal to the controller 10. The vibrator vibrates part of or the entire smartphone 1. The vibrator includes, for example, a piezoelectric element or an eccentric motor in order to generate vibration. The smartphone 1 includes a function module naturally used to maintain the function of the smartphone 1 such as a battery.

Flow of processing by the smartphone 1 will be described referring to FIGS. 2 to 8. Each of FIGS. 2 to 8 is a flowchart illustrating flow of processing by the smartphone 1. Processing illustrated in each of FIGS. 2 to 8 is realized when the controller 10 executes the control code 9A or the like stored in the storage 9.

Figure 2:
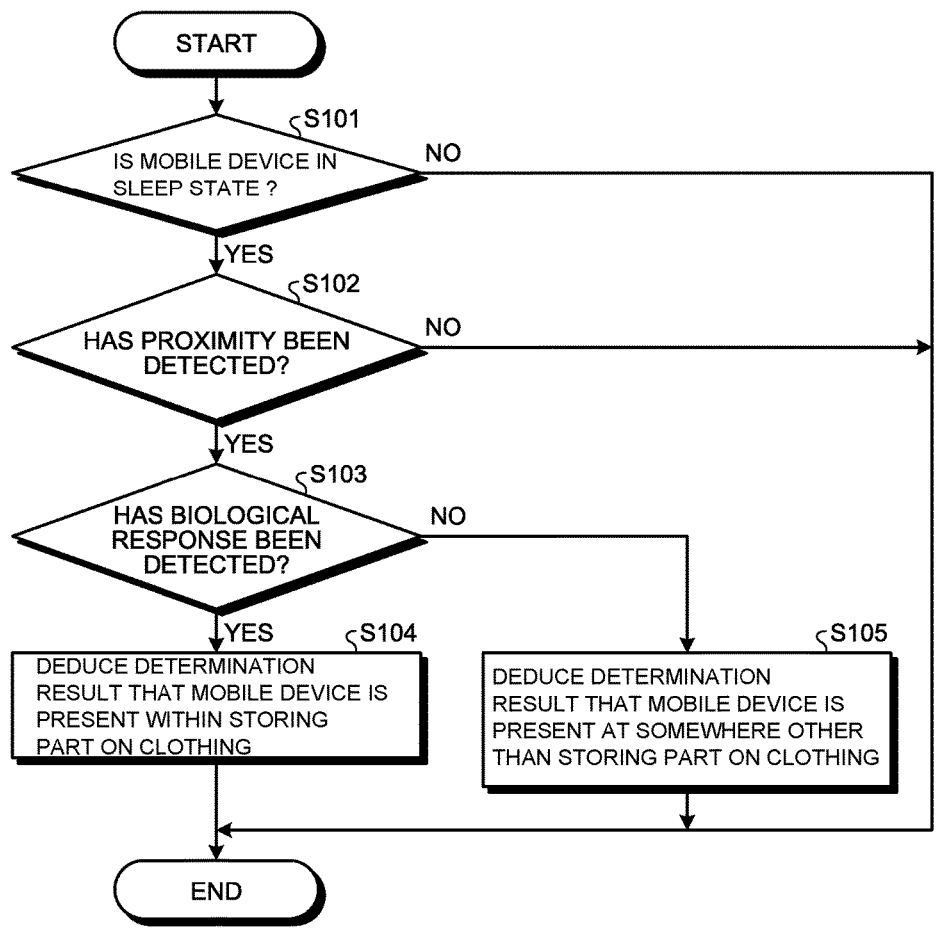
FIG. 2 is a flowchart illustrating flow of processing by a smartphone according to an example of the plurality of embodiments.

Flow of processing carried out by the smartphone 1 to start processing depending on whether the mobile device is in the sleep state as an occasion will be described with reference to FIG. 2. As illustrated in FIG. 2, the controller 10 determines whether the mobile device is in the sleep state (Step S101).

When the mobile device is in the sleep state as a result of the determination (Step S101: Yes), the controller 10 determines whether the proximity has been detected (Step S102).

When the proximity has been detected as a result of the determination (Step S102: Yes), the controller 10 determines whether the biological response has been detected (Step S103).

When the biological response has been detected as a result of the determination (Step S103: Yes), the controller 10 deduces a determination result that the mobile device is present within a storing part on clothing (Step S104) and then terminates the processing illustrated in FIG. 2.

On the other hand, when the biological response has not been detected as a result of the determination (Step S103: No), the controller 10 deduces a determination result that the mobile device is present at somewhere other than the storing part on the clothing (Step S105) and then terminates the processing illustrated in FIG. 2.

At aforementioned Step S102, when the proximity has not been detected as a result of the determination (Step S102: No), the controller 10 terminates the processing illustrated in FIG. 2.

At aforementioned Step S101, when the mobile device is not in the sleep state as a result of the determination (Step S101: No), the controller 10 terminates the processing illustrated in FIG. 2.

In the processing illustrated in FIG. 2, the sleep state can include any state where the display 2A is turned off. In the processing illustrated in FIG. 2, the controller 10 can detect at least one of the heartbeat, the pulse of the heart, and the electrical signal emitted from the heart as the biological response. The controller 10 can detect at least one type of gas discharged to the outside of the body as the biological response from among acetone, carbon dioxide, nonenal, ammonia, methane, and so on. Hereinafter, the same applies to processing illustrated in FIG. 3 to FIG. 8.

Figure 3:
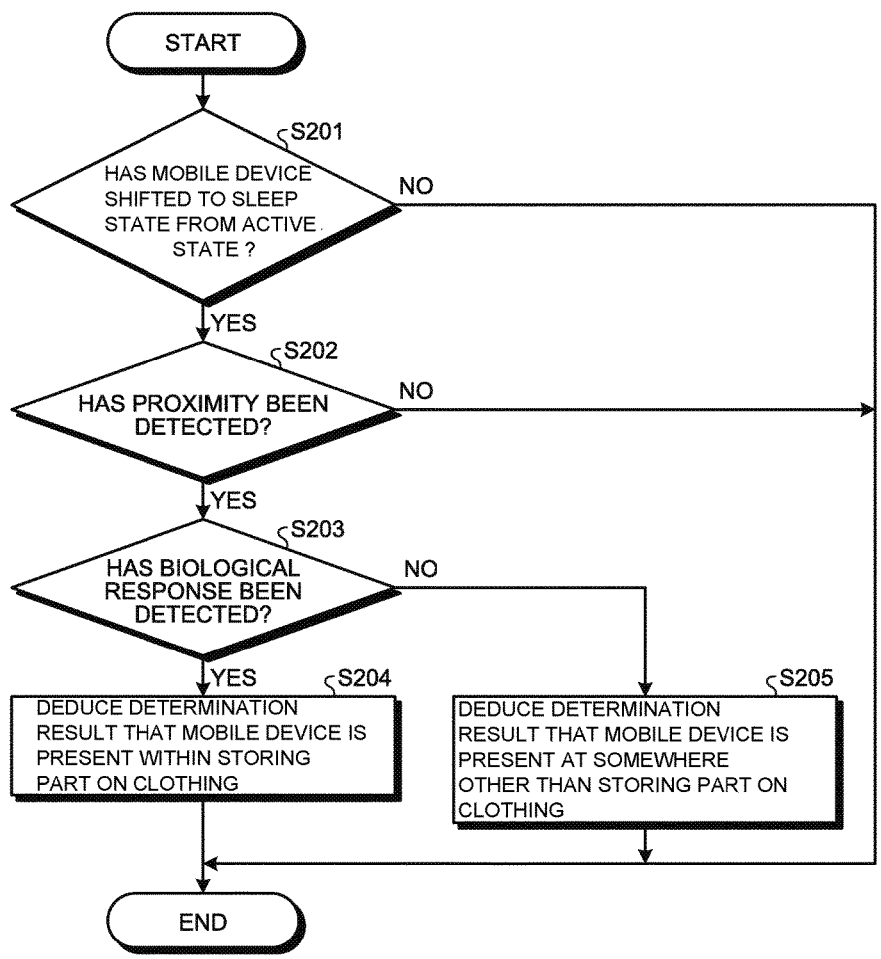
FIG. 3 is a flowchart illustrating flow of processing by a smartphone according to an example of the plurality of embodiments.

Flow of processing carried out by the smartphone 1 to start processing on an occasion when the mobile device has shifted to the sleep state from the active state will be described with reference to FIG. 3. As illustrated in FIG. 3, the controller 10 determines whether the mobile device has shifted to the sleep state from the active state (Step S201).

When the mobile device has shifted to the sleep state from the active state as a result of the determination (Step S201: Yes), the controller 10 determines whether the proximity has been detected (Step S202).

When the proximity has been detected as a result of the determination (Step S202: Yes), the controller 10 determines whether the biological response has been detected (Step S203).

When the biological response has been detected as a result of the determination (Step S203: Yes), the controller 10 deduces a determination result that the mobile device is present within a storing part on clothing (Step S204) and then terminates the processing illustrated in FIG. 3.

On the other hand, when the biological response has not been detected as a result of the determination (Step S203: No), the controller 10 deduces a determination result that the mobile device is present at somewhere other than the storing part on the clothing (Step S205) and then terminates the processing illustrated in FIG. 3.

At aforementioned Step S202, when the proximity has not been detected as a result of the determination (Step S202: No), the controller 10 terminates the processing illustrated in FIG. 3.

At aforementioned Step S201, when the mobile device has not shifted to the sleep state from the active state as a result of the determination (Step S201: No), the controller 10 terminates the processing illustrated in FIG. 3.

Figure 4:
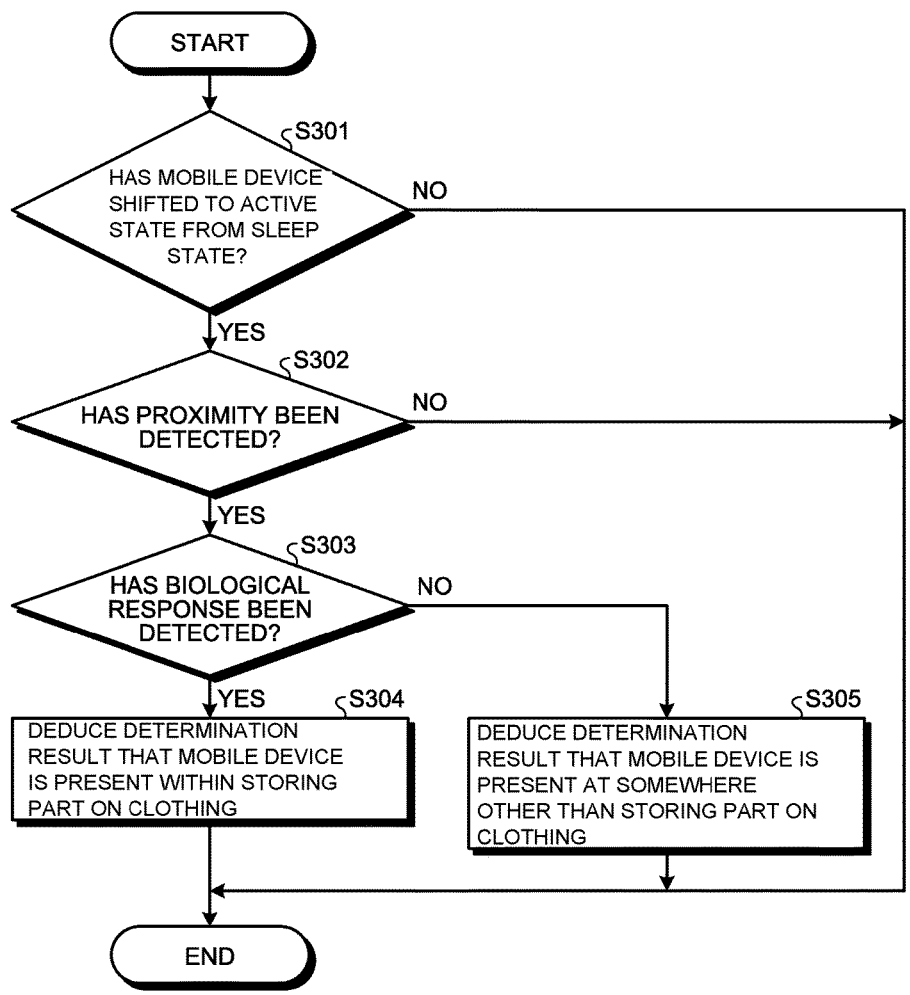
FIG. 4 is a flowchart illustrating flow of processing by a smartphone according to an example of the plurality of embodiments.

Flow of processing carried out by the smartphone 1 to start processing on an occasion when the mobile device has shifted to the active state from the sleep state will be described with reference to FIG. 4. As illustrated in FIG. 4, the controller 10 determines whether the mobile device has shifted to the active state from the sleep state (Step S301).

When the mobile device has shifted to the active state from the sleep state as a result of the determination (Step S301: Yes), the controller 10 determines whether the proximity has been detected (Step S302).

When the proximity has been detected as a result of the determination (Step S302: Yes), the controller 10 determines whether the biological response has been detected (Step S303).

When the biological response has been detected as a result of the determination (Step S303: Yes), the controller 10 deduces a determination result that the mobile device is present within a storing part on clothing (Step S304) and then terminates the processing illustrated in FIG. 4.

On the other hand, when the biological response has not been detected as a result of the determination (Step S303: No), the controller 10 deduces a determination result that the mobile device is present at somewhere other than the storing part on the clothing (Step S305) and then terminates the processing illustrated in FIG. 4.

At aforementioned Step S302, when the proximity has not been detected as a result of the determination (Step S302: No), the controller 10 terminates the processing illustrated in FIG. 4.

At aforementioned Step S301, when the mobile device has not shifted to the active state from the sleep state as a result of the determination (Step S301: No), the controller 10 terminates the processing illustrated in FIG. 4.

In the processing illustrated in FIG. 4, the active state can include any state where the display 2A is turned on.

Figure 5:
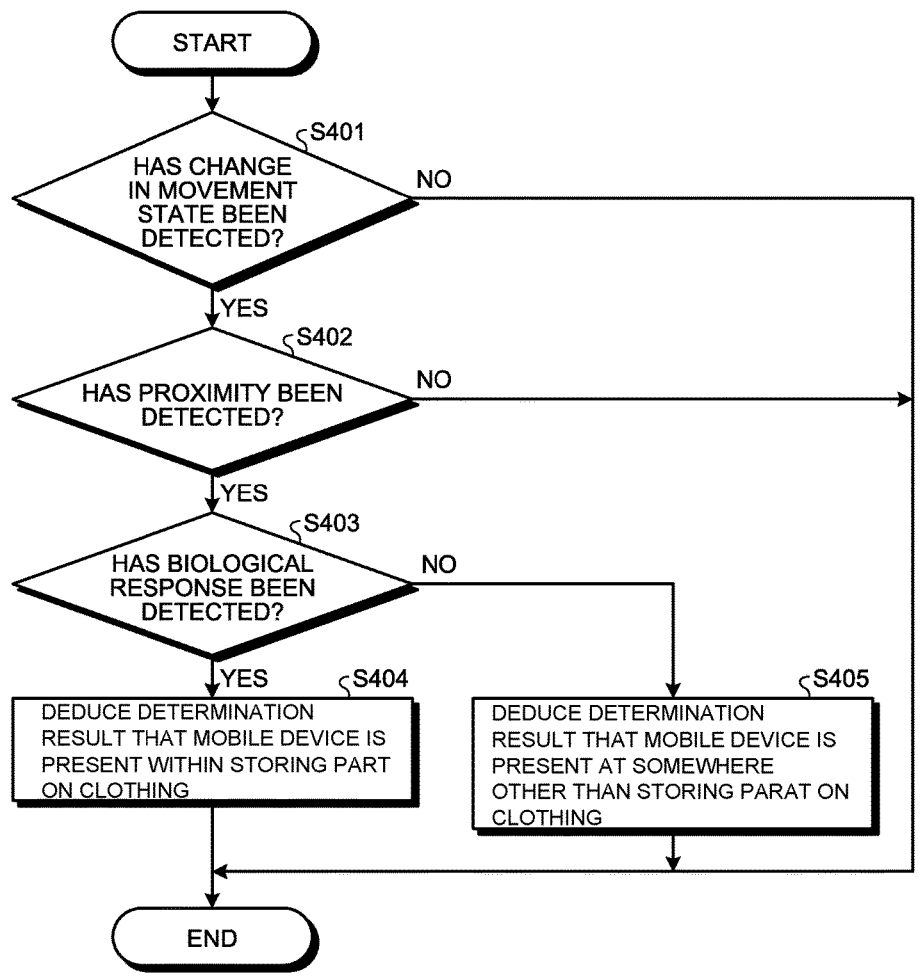
FIG. 5 is a flowchart illustrating flow of processing by a smartphone according to an example of the plurality of embodiments.

Flow of processing carried out by the smartphone 1 to start processing on an occasion when the movement state of the mobile device has changed will be described with reference to FIG. 5. As illustrated in FIG. 5, the controller 10 determines whether a change in the movement state of the mobile device has been detected (Step S401).

When a change in the movement state of the mobile device has been detected as a result of the determination (Step S401: Yes), the controller 10 determines whether the proximity has been detected (Step S402).

When the proximity has been detected as a result of the determination (Step S402: Yes), the controller 10 determines whether the biological response has been detected (Step S403).

When the biological response has been detected as a result of the determination (Step S403: Yes), the controller 10 deduces a determination result that the mobile device is present within a storing part on clothing (Step S404) and then terminates the processing illustrated in FIG. 5.

On the other hand, when the biological response has not been detected as a result of the determination (Step S403: No), the controller 10 deduces a determination result that the mobile device is present at somewhere other than the storing part on the clothing (Step S405) and then terminates the processing illustrated in FIG. 5.

At aforementioned Step S402, when the proximity has not been detected as a result of the determination (Step S402: No), the controller 10 terminates the processing illustrated in FIG. 5.

At aforementioned Step S401, when a change in the movement state of the mobile device has not been detected as a result of the determination (Step S401: No), the controller 10 terminates the processing illustrated in FIG. 5.

In the processing illustrated in FIG. 5, a change in the movement state of the mobile device includes a change from a stop state to a movement state and a change from a movement state to a stop state. In the processing illustrated in FIG. 5, a change in the movement state of the mobile device includes a change in a classification of conveyance.

Figure 6:
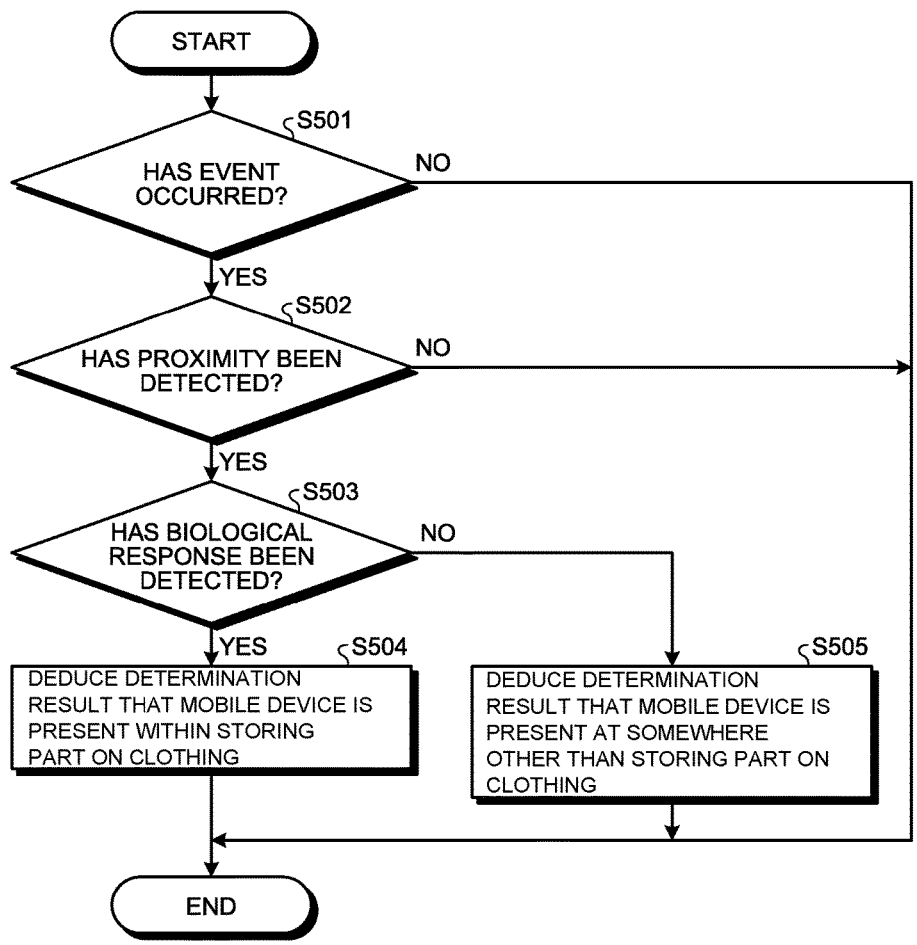
FIG. 6 is a flowchart illustrating flow of processing by a smartphone according to an example of the plurality of embodiments.

Flow of processing carried out by the smartphone 1 to start processing on an occasion when an event has occurred in the mobile device will be described with reference to FIG. 6. As illustrated in FIG. 6, the controller 10 determines whether an event has occurred (Step S501).

When an event has occurred as a result of the determination (Step S501: Yes), the controller 10 determines whether the proximity has been detected (Step S502).

When the proximity has been detected as a result of the determination (Step S502: Yes), the controller 10 determines whether the biological response has been detected (Step S503).

When the biological response has been detected as a result of the determination (Step S503: Yes), the controller 10 deduces a determination result that the mobile device is present within a storing part on clothing (Step S504) and then terminates the processing illustrated in FIG. 6.

On the other hand, when the biological response has not been detected as a result of the determination (Step S503: No), the controller 10 deduces a determination result that the mobile device is present at somewhere other than the storing part on the clothing (Step S505) and then terminates the processing illustrated in FIG. 6.

At aforementioned Step S502, when the proximity has not been detected as a result of the determination (Step S502: No), the controller 10 terminates the processing illustrated in FIG. 6.

At aforementioned Step S501, when an event has not occurred as a result of the determination (Step S501: No), the controller 10 terminates the processing illustrated in FIG. 6.

In the processing illustrated in FIG. 6, the event occurring in the mobile device includes an incoming call and pop-up notifications by the respective applications such as a mail reception notification by the mail application 9C and a reminder notification by the scheduling application 9D.

Figure 7:
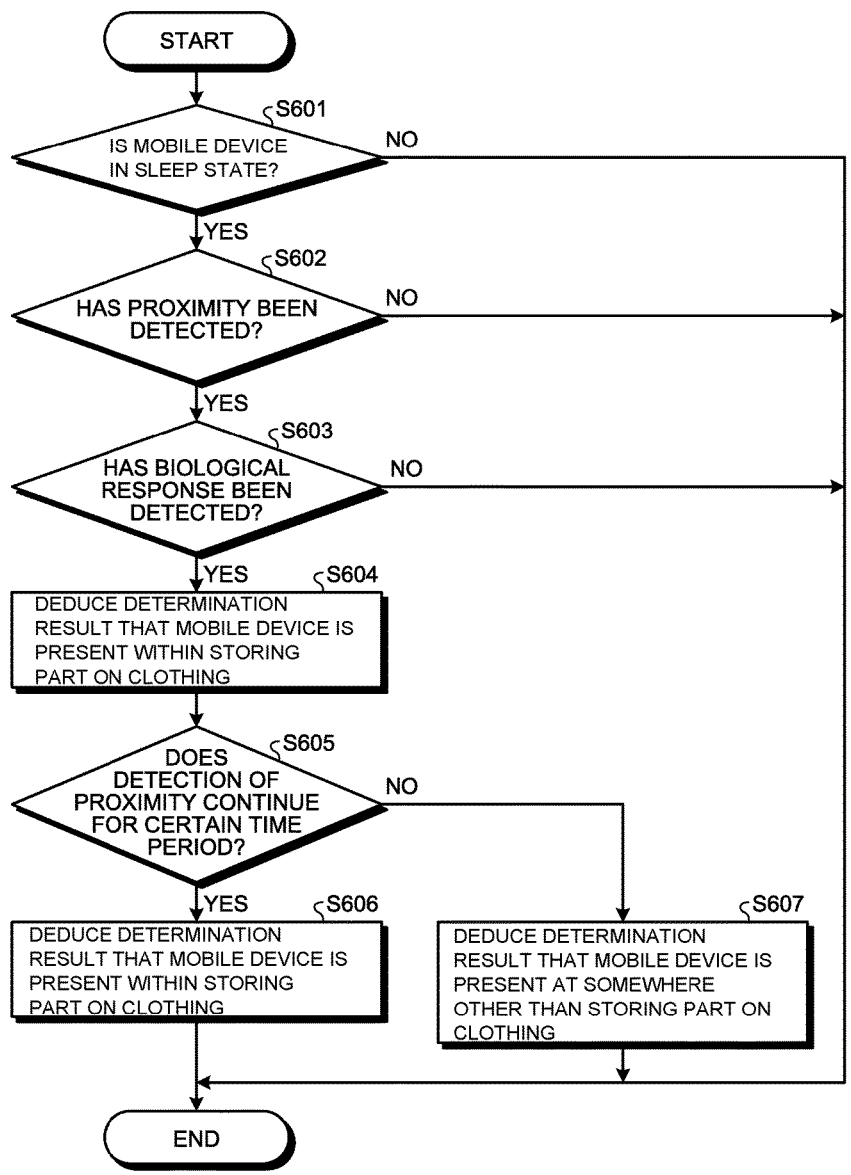
FIG. 7 is a flowchart illustrating flow of processing by a smartphone according to an example of the plurality of embodiments.

Flow of processing carried out by the smartphone 1 to deduce a determination result on whether the mobile device is present within a storing part on clothing depending on a condition of whether the detection of the proximity is continuously detected for a certain time period after the biological response is detected will be described with reference to FIG. 7. As illustrated in FIG. 7, the controller 10 determines whether the mobile device is in the sleep state (Step S601).

When the mobile device is in the sleep state as a result of the determination (Step S601: Yes), the controller 10 determines whether the proximity has been detected (Step S602).

When the proximity has been detected as a result of the determination (Step S602: Yes), the controller 10 determines whether the biological response has been detected (Step S603).

When the biological response has been detected as a result of the determination (Step S603: Yes), the controller 10 deduces a determination result that the mobile device is present within a storing part on clothing (Step S604).

Subsequently, the controller 10 determines whether the detection of the proximity continues for a certain time period (Step S605).

When the detection of the proximity continues for the certain time period as a result of the determination (Step S605: Yes), the controller 10 deduces (maintains) a determination result that the mobile device is present within the storing part on the clothing (Step S606) and then terminates the processing illustrated in FIG. 7.

On the other hand, when the detection of the proximity does not continue for the certain time period as a result of the determination (Step S605: No), the controller 10 deduces a determination result that the mobile device is present at somewhere other than the storing part on the clothing (Step S607) and then terminates the processing illustrated in FIG. 7.

At aforementioned Step S603, when the biological response has not been detected as a result of the determination (Step S603: No), the controller 10 terminates the processing illustrated in FIG. 7.

At aforementioned Step S602, when the proximity has not been detected as a result of the determination (Step S602: No), the controller 10 terminates the processing illustrated in FIG. 7.

At aforementioned Step S601, when the mobile device is not in the sleep state as a result of the determination (Step S601: No), the controller 10 terminates the processing illustrated in FIG. 7.

In the processing illustrated in FIG. 7, an arbitrary time period can be set for the time condition set as a time period for which the detection of the proximity continues. The processing illustrated in FIG. 7 can be applied similarly to the processing illustrated in FIG. 3 to FIG. 6.

Figure 8:
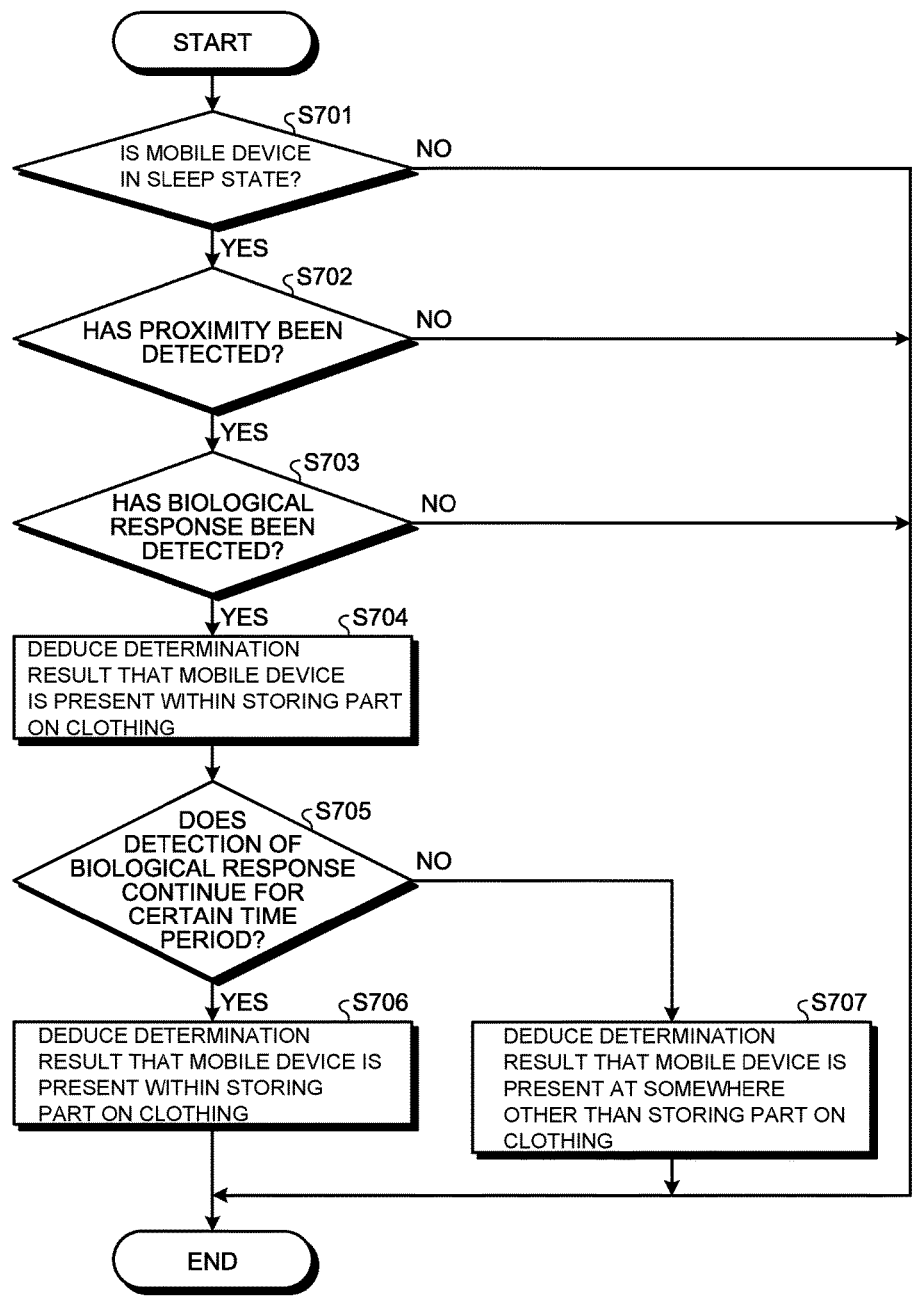
FIG. 8 is a flowchart illustrating flow of processing by a smartphone according to an example of the plurality of embodiments.

Flow of processing carried out by the smartphone 1 to deduce a determination result on whether the mobile device is present within a storing part on clothing depending on a condition of whether the detection of the biological response is continuously detected for a certain time period after the biological response is detected will be described with reference to FIG. 8. As illustrated in FIG. 8, the controller 10 determines whether the mobile device is in the sleep state (Step S701).

When the mobile device is in the sleep state as a result of the determination (Step S701: Yes), the controller 10 determines whether the proximity has been detected (Step S702).

When the proximity has been detected as a result of the determination (Step S702: Yes), the controller 10 determines whether the biological response has been detected (Step S703).

When the biological response has been detected as a result of the determination (Step S703: Yes), the controller 10 deduces a determination result that the mobile device is present within a storing part on clothing (Step S704).

Subsequently, the controller 10 determines whether the detection of the biological response continues for a certain time period (Step S705).

When the detection of the biological response continues for the certain time period as a result of the determination (Step S705: Yes), the controller 10 deduces (or maintains) a determination result that the mobile device is present within the storing part on the clothing (Step S706) and then terminates the processing illustrated in FIG. 8.

On the other hand, when the detection of the biological response does not continue for the certain time period as a result of the determination (Step S705: No), the controller 10 deduces a determination result that the mobile device is present at somewhere other than the storing part on the clothing (Step S707) and then terminates the processing illustrated in FIG. 8.

At aforementioned Step S703, when the biological response has not been detected as a result of the determination (Step S703: No), the controller 10 terminates the processing illustrated in FIG. 8.

At aforementioned Step S702, when the proximity has not been detected as a result of the determination (Step S702: No), the controller 10 terminates the processing illustrated in FIG. 8.

At aforementioned Step S701, when the mobile device is not in the sleep state as a result of the determination (Step S701: No), the controller 10 terminates the processing illustrated in FIG. 8.

In the processing illustrated in FIG. 8, an arbitrary time period can be set for the time condition set as a time period for which the detection of the biological response continues.

The smartphone 1 may deduce a determination result that the mobile device is present within a storing part on clothing when the biological response is detected in a case where the proximity has been detected. Such a smartphone 1 can detect a situation of the mobile device being present within a storing part on clothing as a situation where the mobile electronic device is put.

The aforementioned plurality of embodiments has described an example where the smartphone 1 includes the proximity sensor 5 and the biological response detection sensor 16 separately. A plurality of embodiments below will describe an example in a case where the smartphone 1 integrates the proximity sensor 5 and the biological response detection sensor 16 functionally.

Figure 9:
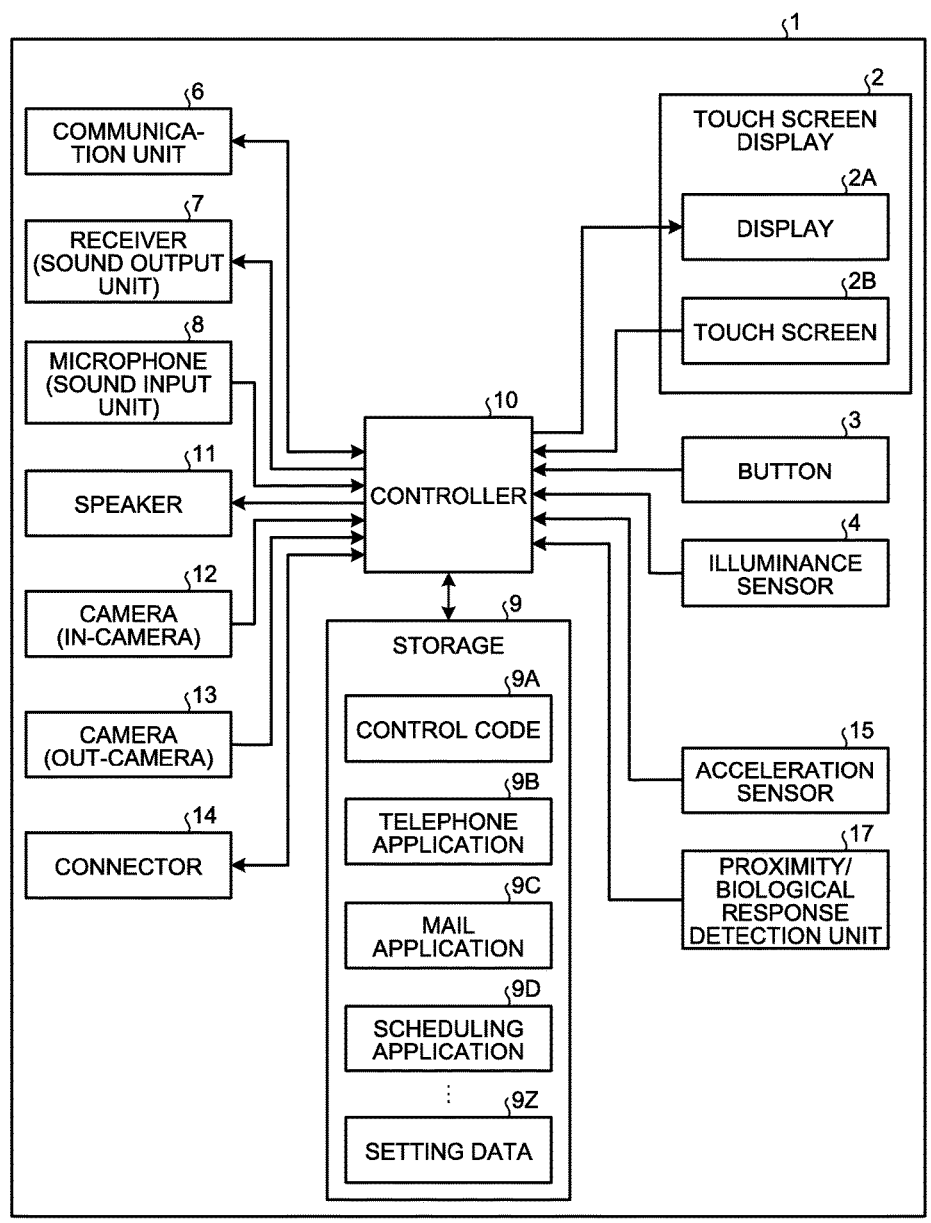
FIG. 9 is a block diagram illustrating a function configuration of a smartphone according to an example of the plurality of embodiments.

FIG. 9 is a block diagram illustrating a function configuration of a smartphone 1. In the description below, similar constituent members are denoted by the same reference numeral in some cases. In the description below, duplicated description is omitted in some cases. In other words, the smartphone 1 may include the configurations and the processing of the aforementioned plurality of embodiments even when not mentioned in the description below.

The smartphone 1 includes a proximity/biological response detection unit 17. The proximity/biological response detection unit 17 is capable of carrying out one of the detection of the proximity and the detection of the biological response under the control of a controller 10. Action states of the proximity/biological response detection unit 17 include a proximity detection mode for detecting the proximity and a biological detection mode for detecting the biological response.

A control code 9A may provide a function for switching between the detection of the proximity and the detection of the biological response when causing the proximity/biological response detection unit 17 to carry out the detection.

By executing the control code 9A, the controller 10 may realize processing of switching between the detection of the proximity and the detection of the biological response when causing the proximity/biological response detection unit 17 to carry out the detection.

Figure 10:
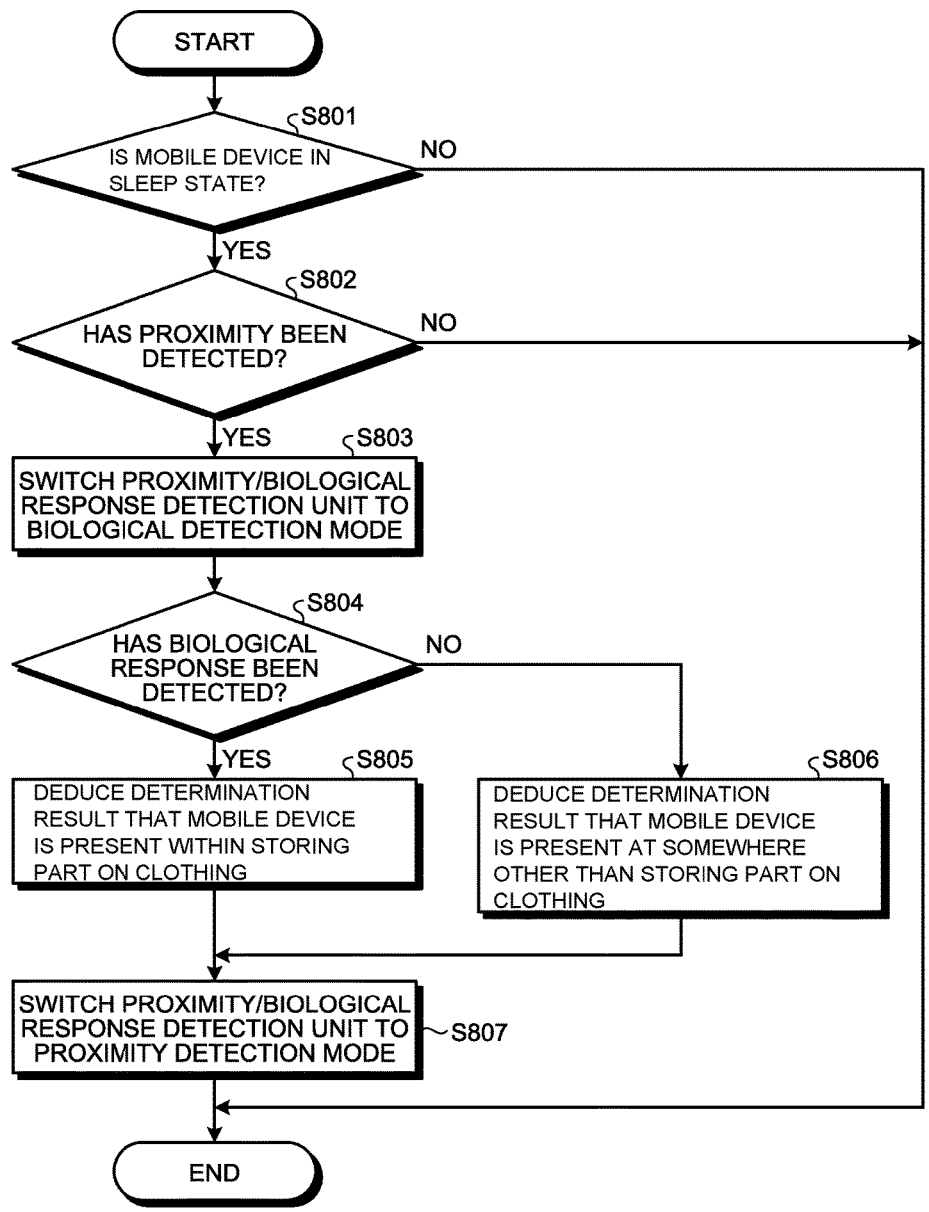
FIG. 10 is a flowchart illustrating flow of processing by a smartphone according to an example of the plurality of embodiments.

FIG. 10 is a flowchart illustrating flow of processing by the smartphone 1. The processing illustrated in FIG. 10 is realized when the controller 10 executes the control code 9A or the like stored in a storage 9.

As illustrated in FIG. 10, the controller 10 determines whether the mobile device is in the sleep state (Step S801).

When the mobile device is in the sleep state as a result of the determination (Step S801: Yes), the controller 10 determines whether the proximity has been detected (Step S802).

When the proximity has been detected as a result of the determination (Step S802: Yes), the controller 10 switches the action state of the proximity/biological response detection unit 17 to the biological detection mode (Step S803).

Subsequently, the controller 10 determines whether the biological response has been detected (Step S804).

When the biological response has been detected as a result of the determination (Step S804: Yes), the controller 10 deduces a determination result that the mobile device is present within a storing part on clothing (Step S805). In contrast to this, when the biological response has not been detected as a result of the determination (Step S804: No), the controller 10 deduces a determination result that the mobile device is present at somewhere other than the storing part on the clothing (Step S806).

Subsequently, the controller 10 switches the action state of the proximity/biological response detection unit 17 to the proximity detection mode (Step S807) and then terminates the processing illustrated in FIG. 10.

At aforementioned Step S802, when the proximity has not been detected as a result of the determination (Step S802: No), the controller 10 terminates the processing illustrated in FIG. 10.

At aforementioned Step S801, when the mobile device is not in the sleep state as a result of the determination (Step S801: No), the controller 10 terminates the processing illustrated in FIG. 10.

The smartphone 1 may realize the detection of the proximity and the detection of the biological response by using the proximity/biological response detection unit 17. The smartphone 1 having such a configuration can reduce cost for realizing the aforementioned processing.

The smartphone 1 can carry out processing of switching between the detection of the proximity and the detection of the biological response when causing the proximity/biological response detection unit 17 to carry out the detection.

In a case where it is determined that the mobile device is present within a storing part, the smartphone 1 may stop a near field wireless communication function so as not to carry out near field wireless communication. A plurality of embodiments below will describe an example where the near field wireless communication function is stopped.

In the description below, similar constituent members are denoted by the same reference numeral in some cases. In the description below, duplicated description is omitted in some cases. In other words, a smartphone 1 may include the configurations and the processing of the aforementioned plurality of embodiments even when not mentioned in the description below.

For example, when it is determined that the mobile device is present within a storing part, a control code 9A is capable of providing a function for stopping the near field wireless communication function. The near field wireless communication function includes IEEE802.11, Bluetooth (registered trademark), the infrared data association (IrDA), the near field communication (NFC), the wireless personal area network (WPAN), and so on.

For example, when it is determined that the mobile device is present within a storing part, a controller 10 may carry out processing of stopping the near field wireless communication function by executing the control code 9A.

FIG. 11 is an exemplary flowchart illustrating flow of processing by the smartphone 1. The processing illustrated in FIG. 11 is realized when the controller 10 executes the control code 9A or the like stored in a storage 9.

As illustrated in FIG. 11, the controller 10 determines whether the mobile device is in the sleep state (Step S901).

When the mobile device is in the sleep state as a result of the determination (Step S901: Yes), the controller 10 determines whether the proximity has been detected (Step S902).

When the proximity has been detected as a result of the determination (Step S902: Yes), the controller 10 switches the action state of a proximity/biological response detection unit 17 to the biological detection mode (Step S903).

Subsequently, the controller 10 determines whether the biological response has been detected (Step S904).

When the biological response has been detected as a result of the determination (Step S904: Yes), the controller 10 deduces a determination result that the mobile device is present within a storing part on clothing (Step S905).

Subsequently, the controller 10 stops the near field wireless communication function (Step S906).

Subsequently, the controller 10 switches the action state of the proximity/biological response detection unit 17 to the proximity detection mode (Step S907) and then terminates the processing illustrated in FIG. 11.

At aforementioned Step S904, when the biological response has not been detected as a result of the determination (Step S904: No), the controller 10 deduces a determination result that the mobile device is present at somewhere other than the storing part on the clothing (Step S908) and then proceeds to the processing procedure at aforementioned Step S907.

At aforementioned Step S902, when the proximity has not been detected as a result of the determination (Step S902: No), the controller 10 terminates the processing illustrated in FIG. 11.

At aforementioned Step S901, when the mobile device is not in the sleep state as a result of the determination (Step S901: No), the controller 10 terminates the processing illustrated in FIG. 11.

In a case where it is determined that the mobile device is present within a storing part, the smartphone 1 may stop the near field wireless communication function. The smartphone 1 having such a configuration can save electric power unnecessarily consumed by the near field wireless communication function.

In the description below, similar constituent members are denoted by the same reference numeral in some cases. In the description below, duplicated description is omitted in some cases. In other words, a smartphone 1 may include the configurations and the processing of the aforementioned plurality of embodiments even when not mentioned in the description below.

For example, in a case where contact is being detected in the vicinity of a proximity/biological response detection unit 17 after the proximity and the biological response are detected, a control code 9A may provide a function for not deducing a determination result that the mobile device is present within a storing part provided on clothing.

For example, in a case where contact is being detected in the vicinity of the proximity/biological response detection unit 17 after the proximity and the biological response are detected, a controller 10 may realize processing of not deducing a determination result that the mobile device is present within a storing part provided on clothing by executing the control code 9A. FIG. 12 is a view for explaining exemplary processing by the smartphone 1. In the example illustrated in FIG. 12, a portion of a finger belonging to a hand H1 of the user is in contact with the touch screen display 2. In the example illustrated in FIG. 12, a contact position of the user's finger on the touch screen display 2 is in the vicinity of the proximity/biological response detection unit 17. In the example illustrated in FIG. 12, because contact is detected in the vicinity of the proximity/biological response detection unit 17 after the proximity and the biological response are detected, the controller 10 does not deduce a determination result that the mobile device is present within a storing part provided on clothing.

FIG. 13 is a flowchart illustrating exemplary flow of processing by the smartphone 1. The processing illustrated in FIG. 13 is realized when the controller 10 executes the control code 9A or the like stored in a storage 9.

As illustrated in FIG. 13, the controller 10 determines whether the mobile device is in the sleep state (Step S1001).

When the mobile device is in the sleep state as a result of the determination (Step S1001: Yes), the controller 10 determines whether the proximity has been detected (Step S1002).

When the proximity has been detected as a result of the determination (Step S1002: Yes), the controller 10 switches the action state of a proximity/biological response detection unit 17 to the biological detection mode (Step S1003).

Subsequently, the controller 10 determines whether the biological response has been detected (Step S1004).

When the biological response has been detected as a result of the determination (Step S1004: Yes), the controller 10 determines whether the contact is being detected in the vicinity of the proximity/biological response detection unit 17 (Step S1005).

When the contact is not being detected in the vicinity of the proximity/biological response detection unit 17 as a result of the determination (Step S1005: No), the controller 10 deduces a determination result that the mobile device is present within a storing part on clothing (Step S1006).

Subsequently, the controller 10 switches the action state of the proximity/biological response detection unit 17 to the proximity detection mode (Step S1007) and then terminates the processing illustrated in FIG. 13.

At aforementioned Step S1005, when the contact is being detected in the vicinity of the proximity/biological response detection unit 17 as a result of the determination (Step S1005: Yes), the controller 10 deduces a determination result that the mobile device is present at somewhere other than the storing part on the clothing (Step S1008) and then proceeds to the processing procedure at aforementioned Step S1007.

At aforementioned Step S1004, when the biological response has not been detected as a result of the determination (Step S1004: No), the controller 10 proceeds to the processing procedure at aforementioned Step S1008.

At aforementioned Step S1002, when the proximity has not been detected as a result of the determination (Step S1002: No), the controller 10 terminates the processing illustrated in FIG. 13.

At aforementioned Step S1001, when the mobile device is not in the sleep state as a result of the determination (Step S1001: No), the controller 10 terminates the processing illustrated in FIG. 13.

In a case where the contact is being detected in the vicinity of the proximity/biological response detection unit 17 after the proximity and the biological response are detected, the smartphone 1 does not deduce a determination result that the mobile device is present within a storing part provided on clothing. The smartphone 1 having such a configuration can avoid an outcome in which a determination result that the mobile device is present within a storing part is incorrectly deduced due to a fact that the contact position of the user during operation is in the vicinity of the proximity/biological response detection unit 17.

Some aforementioned embodiments have described the smartphone 1 as an example of the apparatus. However, the apparatus is not limited to the smartphone 1. The apparatus may be an apparatus other than the smartphone as long as the apparatus is an electronic device that can be accommodated within a storing part on clothing.

In order to fully and clearly disclose the technique according to the accompanying claims, some characteristic embodiments have been described. However, the accompanying claims are not construed to be limited to some aforementioned embodiments and should be embodied by all of the modifications and the alternative configurations that a person skilled in the art of the applicable technical field can create within the scope of the fundamental matters indicated in this description.

In the present application, the expressions "when", "during", "if", "in a case", "upon", "in response to determining", and "in response to detecting" can be understood as other expressions when changed depending on situations. In the present application, the expressions "when 'a stated condition or event' is determined", "when 'a stated condition or event' is detected", or "upon determining 'a stated condition or event'", and "in response to determining", "upon detecting", or "in response to detecting" can be understood as other expressions when changed depending on situations. In the present application, the expression "detect" can be understood as the meanings of "measure", "scale", and "sense" depending on situations. In the present application, the expression "state" can be understood as "situation" depending on situations. For example, the movement state can be understood as a movement situation. The state of the mobile electronic device can be understood as the situation of the mobile electronic device.

The invention claimed is:

1. A mobile electronic device, comprising:
a first sensor configured to detect proximity of a user to the mobile electronic device,
a second sensor configured to detect a biological response originating from an inside of a body of the user of the mobile electronic device, including a heartbeat or pulse of the heart of the user, and
a controller configured to determine that the mobile electronic device is present within a storing part provided on clothing when the biological response is detected by the second sensor in a case where proximity of the user to the mobile electronic device has been detected by the first sensor;
wherein
the controller is configured to determine that the mobile electronic device is present within the storing part by virtue of a condition that proximity of the user to the mobile electronic device is continuously detected by the first sensor after determining that the mobile electronic device is present within the storing part, and
the controller is configured to determine that the mobile electronic device is present within the storing part by virtue of a condition that the biological response is continuously detected by the second sensor after determining that the mobile electronic device is present within the storing part.

2. The mobile electronic device according to claim 1, wherein
the controller is configured to determine that the mobile electronic device is present at somewhere other than the storing part when the biological response is not detected by the second sensor in a case where proximity to the mobile electronic device has been detected by the first sensor.

3. The mobile electronic device according to claim 1, wherein
the controller is configured to carry out the determination on whether the mobile electronic device is present within the storing part in a case where the mobile electronic device is in a sleep state.

4. The mobile electronic device according to claim 1, wherein
the controller is configured to carry out the determination on whether the mobile electronic device is present within the storing part by virtue of a condition that the mobile electronic device has shifted to a sleep state from an active state.

5. The mobile electronic device according to claim 1, wherein
the controller is configured to carry out the determination on whether the mobile electronic device is present within the storing part by virtue of a condition that the mobile electronic device has shifted to an active state from a sleep state.

6. The mobile electronic device according to claim 1, further comprising a third sensor configured to detect a change in a movement state of the mobile electronic device, wherein
the controller is configured to carry out the determination on whether the mobile electronic device is present within the storing part by virtue of a condition that a change in the movement state of the mobile electronic device has been detected by the third sensor.

7. The mobile electronic device according to claim 1, wherein
the controller is configured to carry out the determination on whether the mobile electronic device is present within the storing part by virtue of a condition that an event has occurred.

8. The mobile electronic device according to claim 1, wherein
the controller is configured to stop a near field wireless communication function when it is determined that the mobile electronic device is present within the storing part.

9. The mobile electronic device according to claim 1, wherein
in response to detecting that the mobile electronic device is shifted to a second state from a first state, which is different from the second state, the controller is configured to determine whether the proximity to the mobile electronic device is detected by the first sensor.

10. The mobile electronic device according to claim 9, wherein the first state is a sleep state, and the second state is an active state.

11. The mobile electronic device according to claim 1, wherein the controller is configured to cause the first sensor to detect the proximity to the mobile electronic device in response to detecting that the mobile electronic device is at a sleep state.

12. The mobile electronic device according to claim 1, wherein the second sensor is configured to detect the biological response including at least one of a heartbeat of a user of the mobile electronic device, a pulse of the user, an electrical signal emitted from the heart of the user, or a gas discharged from a body of the user.

13. A control method that a mobile electronic device including a sensor is caused to carry out, the control method comprising:
detecting proximity of a user to the mobile electronic device,
detecting a biological response originating from an inside of a body of the user of the mobile electronic device and including a heartbeat or pulse of the heart of the user when proximity of the user to the mobile electronic device is detected,
determining that the mobile electronic device is present within a storing part provided on clothing when the biological response is detected;
determining that the mobile electronic device is present within the storing part by virtue of a condition that proximity of the user to the mobile electronic device is continuously detected by the first sensor after determining that the mobile electronic device is present within the storing part, and
determining that the mobile electronic device is present within the storing part by virtue of a condition that the biological response is continuously detected by the second sensor after determining that the mobile electronic device is present within the storing part.

* * * * *